(12) United States Patent
Baumann et al.

(10) Patent No.: US 8,979,069 B2
(45) Date of Patent: Mar. 17, 2015

(54) SOLIDS-HANDLING EQUIPMENT

(75) Inventors: Paul Smit Baumann, Johannesburg (ZA); Daniel Francis, Johannesburg (ZA)

(73) Assignee: Sasol Technology (Proprietary) Limited, Johannesburg (ZA)

( * ) Notice: Subject to any disclaimer, the term of this patent is extended or adjusted under 35 U.S.C. 154(b) by 0 days.

(21) Appl. No.: 14/122,133

(22) PCT Filed: May 7, 2012

(86) PCT No.: PCT/IB2012/052255
§ 371 (c)(1),
(2), (4) Date: Nov. 25, 2013

(87) PCT Pub. No.: WO2012/164415
PCT Pub. Date: Dec. 6, 2012

(65) Prior Publication Data
US 2014/0124692 A1 May 8, 2014

(30) Foreign Application Priority Data

May 27, 2011 (GB) .................................. 1109131.1

(51) Int. Cl.
*F16K 25/00* (2006.01)
*F16K 1/38* (2006.01)
(52) U.S. Cl.
CPC ................. *F16K 25/005* (2013.01); *F16K 1/38* (2013.01)
USPC ........................... 251/332; 251/357; 251/368
(58) Field of Classification Search
USPC ................................... 251/332, 333, 357, 368
See application file for complete search history.

(56) References Cited

U.S. PATENT DOCUMENTS 3,419,041 A * 12/1968 Jennings ........................ 251/368
4,006,883 A    2/1977 Hilsheimer
(Continued)

FOREIGN PATENT DOCUMENTS

CH    670138 A5    5/1989
GB   2109900 A    6/1983
(Continued)

OTHER PUBLICATIONS

International Search Report, International Patent Application No. PCT/IB2012/052255, dated Aug. 15, 2012, 2 pages.
(Continued)

*Primary Examiner* — John Bastianelli
(74) *Attorney, Agent, or Firm* — Fitch Even Tabin & Flannery LLP (57) ABSTRACT

A closure component for solids-handling equipment includes a closure body configured to close a solids flow path by displacement of the closure body along a stroke axis and a removable metallic sealing element attached to the closure body. The metallic sealing element is configured sealingly to engage an endless metallic seat spaced radially outwardly from the stroke axis when the closure body closes the solids flow path. The closure body includes or defines at least one locating formation to engage and locate the metallic sealing element. The least one locating formation is positioned radially outwardly from the stroke axis and more radially outwardly from the stroke axis than at least a portion of the metallic sealing element so that at least a portion of the metallic sealing element is positioned between the locating formation and the stroke axis, thereby correctly to locate the metallic sealing element in position relative to the closure body or relative to the stroke axis during fitting of the metallic sealing element to the closure body.

13 Claims, 5 Drawing Sheets

(56) References Cited

U.S. PATENT DOCUMENTS

| | | | |
|---|---|---|---|
| 4,202,556 A | | 5/1980 | Makishima et al. |
| 4,315,616 A | * | 2/1982 | Welker .................... 251/332 |
| 4,337,920 A | * | 7/1982 | Parris ..................... 251/357 |
| 4,474,358 A | | 10/1984 | Bennett |
| 5,052,435 A | * | 10/1991 | Crudup et al. ............ 251/332 |
| 6,776,392 B1 | * | 8/2004 | Reilly ..................... 251/357 |
| 6,793,198 B2 | * | 9/2004 | Robison et al. .......... 251/357 |
| 2009/0065073 A1 | | 3/2009 | Davis |

FOREIGN PATENT DOCUMENTS

| | | |
|---|---|---|
| GB | 2137736 A | 10/1984 |
| WO | 2007/150000 A2 | 12/2007 |

OTHER PUBLICATIONS

International Preliminary Report on Patentability, International Patent Application No. PCT/IB2012/052255, dated May 14, 2013, 15 pages.

* cited by examiner

PRIOR ART

SOLIDS-HANDLING EQUIPMENT

CROSS REFERENCE TO RELATED APPLICATIONS

This application is a national phase application of International Application No. PCT/IB2012/052255, filed May 7, 2012, designating the United States and claiming priority to Great Britain Patent Application No. 1109131.1, filed May 27, 2011, both of which are incorporated by reference as if fully rewritten herein.

THIS INVENTION relates to solids-handling equipment. In particular, the invention relates to a closure component for solids-handling equipment, and to a solids-handling closure assembly.

For some solids-handling equipment, such as a Sasol-Lurgi (trade name) or a Sasol® FBDB (trade name) gasifier, it is necessary intermittently or continuously to load and unload particulate material, such as particulate carbonaceous material (e.g. coal) and ash. Thus, for example, in the case of a pressurised gasifier (e.g. a fixed bed dry bottom gasifier), particulate carbonaceous feedstock is loaded into the gasifier, and gasified at elevated temperatures and pressures, and after gasification any remaining ungasified material is removed from the gasifier as ash and passed into a pressurized ash lock. The ash lock is then sealed off from the gasifier, depressurized and the ash removed. To ensure the continuing operation of the pressurised gasifier during the depressurizing of the ash lock, it is important that a pressure seal is maintained between the pressurised gasifier and the ash lock. Similar arrangements may also be used in other pressurised solids-handling equipment.

In the current state of the art, a pressure seal between the pressurised gasifier and the ash lock is achieved with a valve assembly or solids-handling closure assembly comprising of two primary sub-assemblies or assembled components, namely a closure component (typically a conical valve closure body or cone) for closing off a solids flow path, and a separate seat component defining a metallic seat for the closure component. The seat component typically remains stationery while the closure component is hydraulically actuated (typically up and down in a vertical plane) between open and closed conditions, along a common centre line of the closure component and the seat component. Apart from providing a metal-to-metal pressure seal when in the closed condition when a differential pressure is present across the valve assembly, the valve assembly also serves to control material flow through the valve assembly.

In the prior art, the closure component typically includes a closure body in the form of a circular disk-shaped forging with a conical capped section of a diameter larger than a seat bore, connected to a tie rod which serves as a linkage to a hydraulic actuation system. Due to the severe process conditions (an operating pressure of up to about 100 bar(g) and an operating temperature up to 600° C.) and abrasiveness of the ash flowing through the valve assembly, a sealing element in the form of a separate tungsten carbide ring is provided on an outer periphery of the closure body, the ring interfacing with a similar tungsten carbide ring of the seat component to create metal seal surfaces. When the closure component is actuated from an open condition to a closed condition, a pressure seal is thus created by metal-to-metal contact between the surfaces of the tungsten carbide rings of the closure component and the seat component respectively.

With the prior art valve assembly, occasions arise where the pressure seal cannot be maintained due to gas leakage through the valve assembly. In extreme cases, this results in shutdown of the equipment (e.g. a gasifier), which is clearly undesirable as it may severely impact on production levels and income generated from the equipment. The prior art design thus results in inefficient operation and reduction or mitigation of this inefficiency would be beneficial.

Investigations have revealed that leakage through the valve assembly is partly due to problems associated with the design of the closure component and not the seat component. Brittle fracture of the tungsten carbide ring of the closure component occurs as a result of stress induced in the ring, which in turn is caused by differential thermal expansion of the closure body and the tungsten carbide ring. The ring grows at a lesser rate than the closure body due to disparate material properties. Stress is also induced in the tungsten carbide ring of the closure component due to deflection of the tungsten carbide ring of the closure component on impact with the tungsten carbide ring of the seat component, in many cases due to poor retention of the tungsten carbide ring of the closure component in a correct position on the closure body. Furthermore, a leak path often develops between the closure body and the tungsten carbide ring, most likely as a result of said differential thermal expansion and said poor retention of the tungsten carbide ring on the closure body.

The inventors are aware of GB 2137736, GB 2109900 and U.S. Pat. No. 4,474,358, all of which relate to conventional taps and faucets. The inventors are also aware of U.S. Pat. No. 4,006,883 which relates to butterfly valves. These valves are all used in fluid service (i.e. liquid or gas service) and employ a resilient, typically non-metallic seal to provide a pressure tight seal across a fluid flow path. None of these prior art valves is suitable for handling solids flow and none of these references is directed at solving problems associated with metal-to-metal sealing surfaces.

According to one aspect of the invention, there is provided a closure component for solids-handling equipment, the closure component including     a closure body configured to close a solids flow path by displacement of the closure body along a stroke axis; and     a removable metallic sealing element attached to the closure body and configured sealingly to engage an endless metallic seat spaced radially outwardly from the stroke axis when the closure body closes said solids flow path,     the closure body including or defining at least one locating formation to engage and locate the metallic sealing element, said at least one locating formation being positioned radially outwardly from the stroke axis and more radially outwardly from the stroke axis than at least a portion of the metallic sealing element so that at least a portion of the metallic sealing element is positioned between the locating formation and the stroke axis, thereby correctly to locate the metallic sealing element in position relative to the closure body or relative to the stroke axis during fitting of the metallic sealing element to the closure body.

In this specification, the term "component" is thus intended to include an assembled component comprising more than one part, such as a closure component comprising at least a closure body and a sealing element.

Typically, the closure component is configured to close a flow path which is circular in transverse cross section by plugging the flow path.

Advantageously, the presence of one or more locating formations positioned more radially outwardly from the stroke axis than a portion or portions of the sealing element allows the correct positioning of the sealing element, which is typically annular, concentric with the closure body, which is typically circular in plan, at room temperature during assembly of the closure component.

Typically, there is no locating formation radially inwardly of the metallic sealing element such that radially outward displacement of the locating formation as a result of heat expansion of the closure body is inhibited by the presence of the metallic sealing element.

As will be appreciated, with a locating formation as described, outward displacement of the locating formation from a centre of the closure body, i.e. away from the stroke axis, at the operating temperature of the closure component is greater than the outward displacement of the portion of the metallic sealing element between the locating formation and the stroke axis, when the metallic sealing element expands at a lesser rate than the closure body due to disparate material properties. The at least one locating formation thus does not interfere with the metallic sealing element during heat expansion and does not cause stress on the metallic sealing element during heat expansion. Stress induced brittle fracture of the metallic sealing element due to differential expansion is therefore inhibited or prevented.

The metallic sealing element may have an outer periphery circumnavigating the stroke axis and spaced from the stroke axis, with said at least one locating formation being adjacent said outer periphery.

The metallic sealing element may thus have a circular outer periphery, and the at least one locating formation may be in the form of an annular locating surface defined by the closure body, the locating surface defined by the closure body having a diameter marginally greater than that of an annular locating surface of the metallic sealing element, at room temperature. The locating surface of the metallic sealing element may be defined by the outer periphery of the metallic sealing element.

The metallic sealing element may be annular and the closure body may define an annular recess to receive the annular metallic sealing element.

A width of the annular recess taken in a radial direction relative to the stroke axis may be greater than a width of the annular metallic sealing element taken in a radial direction relative to the stroke axis so that, when the annular metallic sealing element is located in the annular recess, the metallic sealing element is abutting against a radially outer periphery of the annular recess, whilst the metallic sealing element is spaced from a radially inner periphery of the annular recess. Thus, preferably, the radially inner periphery of the annular recess is not in contact with the metallic sealing element, at least at room temperature, providing an expansion space for the closure body at the operating temperature of the closure component.

Typically, the closure body, or at least a portion of the closure body in contact with the metallic sealing element, is of graphite-cast iron or ductile iron, and is typically in the form of a disc-shaped forged body with a diameter in plan larger than the seat for the closure component. This metallic sealing element is typically of tungsten carbide and, as indicated hereinbefore, is typically in the form of a ring.

The closure component may include a seal between the closure body and the metallic sealing element. Typically, the seal circumnavigates or extends around the stroke axis. The seal is preferably endless, providing at least one endless seal surface. Also typically, the seal is spaced from the stroke axis.

The seal may be located in an annular recess defined in at least one of the closure body and the metallic sealing element and located between the closure body and the metallic sealing element. Typically, the annular recess is concentric with the stroke axis.

The seal may be in the form of a hollow metal ring with one or more openings so that an interior volume of the ring is open to the immediate environment of the seal. In one embodiment of the invention, the seal is in the form of a metal C-ring.

As will be appreciated, the seal in use typically separates a higher pressure side of the closure component from a lower pressure side of the closure component. Said one or more openings of the seal may be on the higher pressure side of the closure component so that the interior volume of the seal is potentially exposed to the higher pressure.

Advantageously, the seal provides an active seal between surfaces of the closure body and the metallic sealing element. A hollow seal such as a C-ring has the ability to retain its shape both by virtue of material memory and the fact that its inner volume is open to the environment, which allows the hollow seal to expand with increasing pressure. Constant contact is thus established between the seal and the closure body and between the seal and the metallic sealing element. As a result, limited relative movement of parts of the closure component, e.g. the closure body and the metallic sealing element, can be accommodated, e.g. under impact when the closure component slams shut to close the solids flow path. Stress induced in the metallic sealing element due to deflection of the metallic sealing element on impact when the closure component is seated is accordingly reduced.

The metallic sealing element may be held in place against the closure body by a retaining element which bears against the metallic sealing element but which does not pass through the metallic sealing element.

The retaining element may be attached to the closure body radially inwardly from the metallic sealing element, thus extending radially outwardly over a portion of the closure body from where it is attached to the closure body to reach the metallic sealing element.

Preferably, the retaining element is spaced from the closure body so that there is no direct contact between the retaining element and the closure body. Typically, fasteners such as bolts are used to attach the retaining element to the closure body with the retaining element being annular and spaced from the closure body where it extends or spans over the closure body.

Advantageously, in a preferred embodiment of the invention, only a radially outer peripheral portion of the retaining element contacts the metallic sealing element, with no contact between the retaining element and the closure body where the retaining element is attached to the closure body. This configuration provides a spring effect which limits differences in the seating load between the metallic sealing element and the closure body at atmospheric temperature on the one hand, and at elevated operating temperature for the closure component on the other hand, thereby inhibiting or preventing stress induced due to the metallic sealing element deforming or buckling when the closure component is seated to close the solids flow path.

According to another aspect of the invention, there is provided a solids-handling closure assembly which includes
    a closure component displaceable between a closed condition and an open condition to close or open a solids flow path; and
    a seat component providing a metallic seat for the closure component when in the closed condition,
    wherein the closure component is a closure component as hereinbefore described.

Typically, a tungsten carbide ring forms the metallic seat and defines a seat surface where the tungsten carbide ring of the closure component and the tungsten carbide ring of the seat component meet to close the solids flow path and form a seal between the metal-to-metal contact of the tungsten carbide rings.

Typically, the solids-handling closure assembly includes an actuator connected to the closure component, the actuator extending along the solids flow path and passing through the seat component.

The solids-handling closure assembly may form part of a pressurised gasifier for gasification of particulate carbonaceous material, e.g. a fixed bed dry bottom gasifier. In particular, the solids-handling closure assembly may form part of an ash lock valve assembly of a pressurised gasifier. In principle, the solids-handling closure assembly can also be employed as a feedstock closure mechanism for a pressurised gasifier, or in other pressurised equipment or vessels handling solids material at elevated temperatures, e.g. combustion apparatus, pyrolysis apparatus, fluidised bed gasification apparatus, food processing apparatus and bulk material handling equipment for agricultural products or ore beneficiation.

The invention will now be described by way of example with reference to the accompanying diagrammatic drawings in which.

Figure 1:
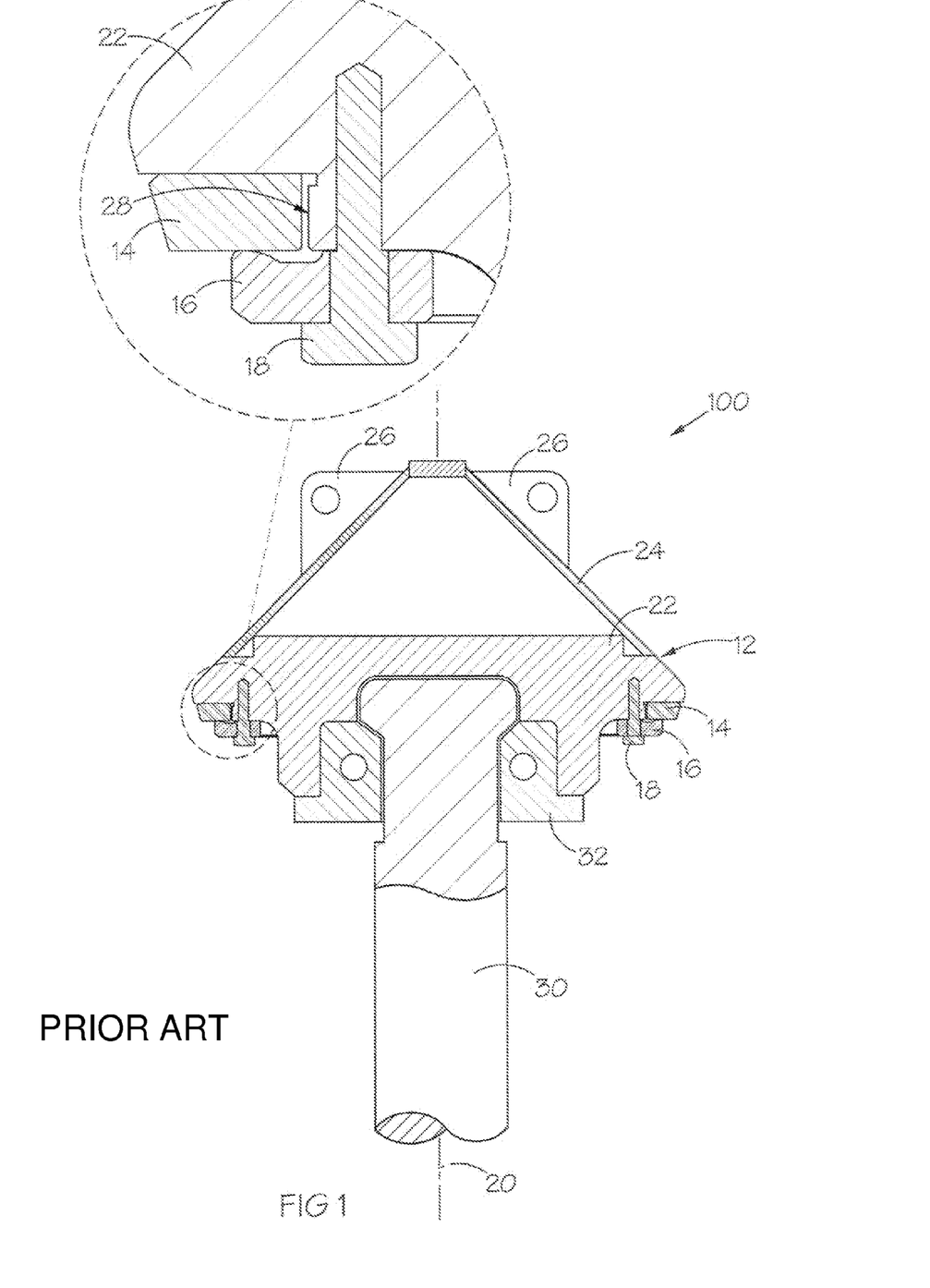
FIG. 1 shows a vertically-sectioned side view of a prior art closure component for a solids-handling closure assembly for solids-handling equipment.

Referring to FIG. 1 of the drawings, reference numeral 100 generally indicates a conventional or prior art closure component or sub-assembly for a solids-handling closure assembly for solids-handling equipment. The closure component 100 shown in FIG. 1 is intended for use as part of an ash lock valve assembly in a fixed bed dry bottom pressurized gasifier.

The closure component 100 includes a closure body 12 with a removably attached metallic sealing element 14 attached to the closure body 12 by a retaining element or clamping ring 16 bolted to the closure body 12 by means of a plurality of bolts 18 arranged concentrically about a centre axis or stroke axis 20 of the closure component 100.

The closure body 12, in the embodiment illustrated in FIG. 1, includes a carrier body 22 and a cone-shaped end piece 24 welded to the carrier body 22. A pair of lifting lugs 26 is provided on the cone-shaped end piece 24. In other embodiments of prior art closure components for solids-handling equipment, the cone-shaped end piece 24 and the carrier body 22 are integrally formed, e.g. as a forged body.

The closure component 100 is intended to close off a solids flow path which is circular in transverse cross-section, at least where the closure component closes off the solids flow path and the closure component 100 is thus also circular in plan. The carrier body 22 is typically of graphite cast iron or ductile iron and the metallic sealing element 14 is typically an annular tungsten carbide ring. Also the retaining element 16 is of a metal or alloy that can handle high operating temperatures and is annular. The retaining element 16 bears against the carrier body 22 where the bolts 18 pass through the retaining element 16, as well as against the metallic sealing element 14 to retain the metallic sealing element 14 in position. The bolts 18 thus do not pass through the metallic sealing element 14.

The carrier body 22 defines a locating formation, in the form of an annular surface 28 positioned radially inwardly from the metallic sealing element 14, which can be used to position the metallic sealing element 14 during assembly of the closure component 100. The annular surface 28 is in turn defined by a step formation in the carrier body 22. The locating formation, defined by the annular surface 28, is thus located between the stroke axis 20 and the metallic sealing element 14.

The closure component 100 in use cooperates with a seat component (not shown) providing an annular metallic seat for the closure component 100. Typically, the seat components remain stationery while the closure component 100 is hydraulically actuated between open and closed conditions, along the stroke axis 20, in a vertical plane. The stroke axis 20 thus typically defines a common centre axis for the closure component 100 and the seat component, and thus for a valve assembly comprising the closure component 100 and the seat component as sub-assemblies. The seat component typically includes a separate tungsten carbide ring similar to the metallic sealing element 14, with the separate tungsten carbide ring defining the metallic seat for the closure component 100. In use, the two tungsten carbide rings define seal surfaces. When the closure component 100 is actuated from an open condition to a closed condition, a pressure seal is thus created by metal-to-metal contact between the seal surfaces of the tungsten carbide rings of the closure component 100 and the seat component respectively.

Advantageously, tungsten carbide is hard enough to provide extended resistance to wear induced by flow of particulate abrasive material over surfaces of the tungsten carbide rings, to provide erosion resistance in the face of high velocity steam flow, and to cut through a solid particle caught between the tungsten carbide rings.

Typically, the diameter of the closure component 100 is larger than a diameter of a seat bore defined by the tungsten carbide ring of the seat component.

The conical shape of the cone-shaped end piece 24 prevents collection of material on top of the closure component 100 when the closure component 100 is in the closed condition and thus prevents ingress of material in between the metallic sealing element 14 and the metallic seat when the closure component 100 moves from the open condition to the closed condition.

A tie rod 30 is attached to the carrier body 22 by means of a collar 32. The tie rod 30 is typically hydraulically actuated thereby to displace the closure component 100 between its closed condition and its open condition.

In high temperature, high pressure abrasive applications of the closure component 100, such as application as part of a valve assembly in an ash lock for a fixed bed dry bottom gasifier, occasions arise where the pressure seal between the metallic sealing element 14 and the tungsten carbide ring of the seat component cannot be maintained so that gas leaks through the valve assembly. This is believed to be due partly to problems associated with the design of the prior art closure component 100, which sometimes results also in the establishment of leak paths between the carrier body 22 and the metallic sealing element 14. The valve assembly is thus unable always to maintain a pressure seal between the gasifier and the ash lock when in a closed condition.

Figure 2:
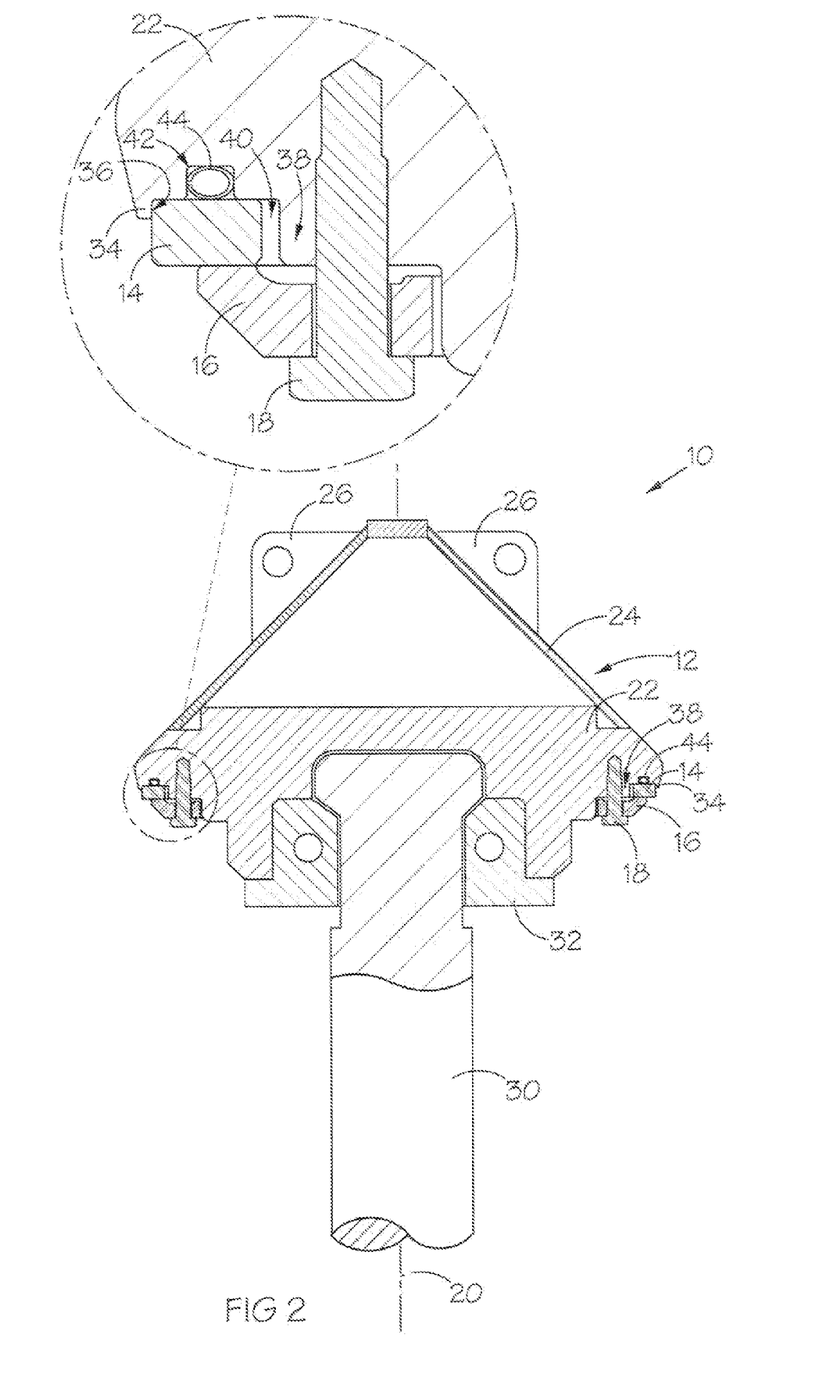
FIG. 2 shows a vertically-sectioned side view of a closure component for a solids-handling closure assembly for solids-handling equipment, in accordance with the invention.
Figure 3:
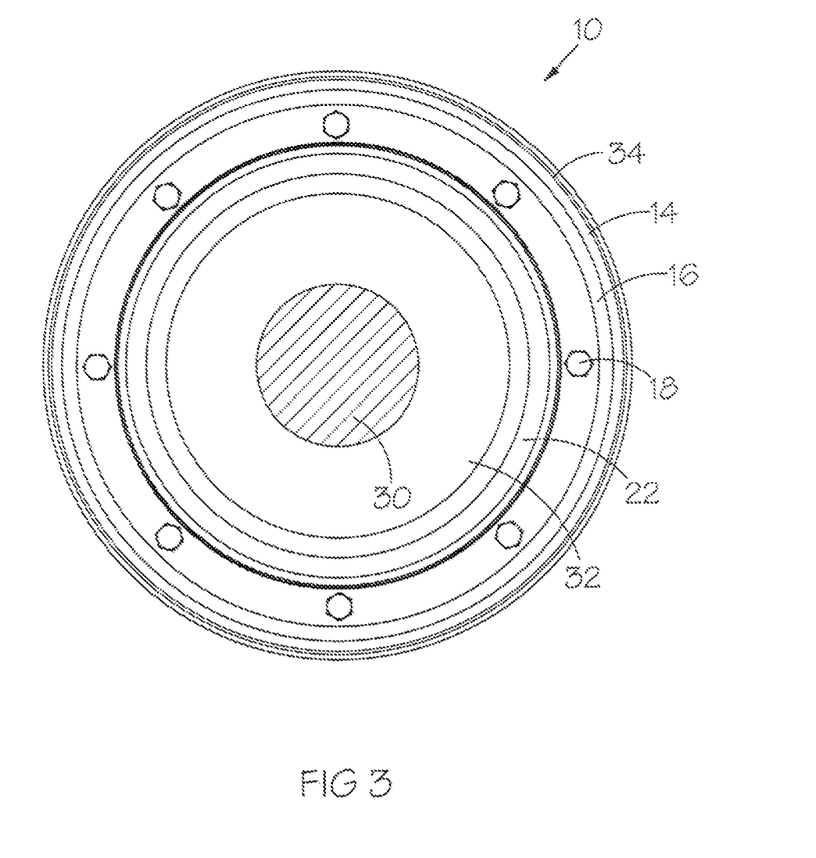
FIG. 3 shows a bottom view of the closure component of FIG. 2.

Referring to FIG. 2 of the drawings, reference numeral 10 generally indicates a closure component for solids-handling equipment, in accordance with the invention. Many parts or features of the closure component 10 are similar to the parts or features of the closure component 100 and unless otherwise indicated, the same reference numerals are thus used to indicate the same or similar parts or features.

A distinct difference between the closure component 10 and the closure component 100, which is immediately apparent from FIG. 2 of the drawings, is that the closure body 12, more particularly the carrier body 22 of the closure component 10 has a peripheral annular lip 34 defining an annular locating surface 36 radially outwardly from the stroke axis 20 and more radially outwardly from the stoke axis 20 than the metallic sealing element 14. The metallic sealing element 14 is thus located or positioned between the lip 34 and the annular locating surface 36 on the one hand, and the stroke axis 20 on the other hand. The annular locating surface 36 is used to locate the metallic sealing element 14 in position relative to the closure body 12 during fitting of the metallic sealing element 14 to the closure body 12, which, as will be appreciated, is usually done at room temperature.

Although, in the embodiment of the closure component 10 illustrated in FIG. 2, a circular or disc-shaped portion 38 of the closure body 12 is located between the metallic sealing element 14 and the stroke axis 20, the portion 38 is spaced from the metallic sealing element 14 thus allowing for radially outward expansion of the portion 38 without the metallic sealing element 14 interfering with such expansion. Radially outward displacement of the portion 38 as a result of heat expansion is thus not inhibited or prevented by the presence of the metallic sealing element 14 clamped to the carrier body 22. Expansion of the portion 38 will thus not cause stress in the metallic sealing element 14 and brittle fracture of the metallic sealing element 14, which is a common problem of the prior art closure component 100, will thus be reduced or eliminated.

Heat expansion of the carrier body 22 is typically greater than heat expansion of the metallic sealing element 14, at the typical operating temperatures of the closure component 10, in view of the disparate properties of the cast iron or ductile iron carrier body 22 and the tungsten carbide sealing element 14. As will be appreciated, the carrier body 22 thus expands at a greater rate than the metallic sealing element 14 and the radially outward positioning of a locating formation, in the form of the annular locating surface 36, is thus important to prevent or inhibit brittle fracture of the tungsten carbide sealing element 14 as a result of differential thermal expansion of the carrier body 22 and the metallic sealing element 14.

An outer diameter of the annular metallic sealing element 14 is only marginally smaller than an inner diameter of the lip 34, i.e. the diameter of the annular locating surface 36, so that during assembly of the closure component 10 the metallic sealing element 14 fits snugly against the lip 34. It is thus easy correctly to position the annular metallic sealing element 14 concentric with the carrier body 22 so that the stroke axis 20 defines a common centre axis for the carrier body 22 and the metallic sealing element 14, during assembly of the closure component 10 at room temperature.

Between the annular, peripheral lip 34 and the disc-shaped portion 38 of the carrier body 22, an annular recess 40 is defined within which the metallic sealing element 14 is received. As can however clearly be seen from FIG. 2, a width of the recess 40, taken in a radial direction relative to the stroke axis 20, is greater than a width of the annular metallic sealing element 14, also taken in a radial direction relative to the stroke axis 20. There is thus significant clearance between the metallic sealing element 14 and the portion 38, allowing for radially outward expansion of the portion 38, whereas the metallic sealing element 14 abuts against the lip 34.

The carrier body 22 defines a further annular recess 42, radially inwardly from the lip 34 and radially outwardly from the portion 38, in a plane above the metallic sealing element 14. An inner diameter of the recess 42 is larger than an inner diameter of the metallic sealing element 14, whereas an outer diameter of the recess 42 is smaller than an outer diameter of the metallic sealing element 14. The annular recess 42 is thus located above the metallic sealing element 14, between the metallic sealing element 14 and the carrier body 22.

A seal 44 is located in the annular recess 42. The seal 44 is in the form of a metal C-ring which opens radially outwardly. The seal 44 is in contact with both the carrier body 22 and the annular metallic sealing element 14. An interior volume of the seal 44 is thus open to the annular recess 42, on a radially outward periphery or side of the annular recess 42. In use, the radially outward periphery or side of the annular recess 42 can potentially be exposed to a higher pressure side of the closure component 10, e.g. if a leak path develops between the metallic sealing element 14 and the carrier body 22. Typically, in application as part of a valve assembly for an ash lock, a higher pressure side of the closure component 10 is above the closure component 10, with a lower pressure side of the closure component 10 being below the closure component 10, with the metallic sealing element 14 separating the higher pressure and lower pressure sides of the closure component 10 in the closed condition of the closure component 10 where there is metal-to-metal contact between the metallic sealing element 14 and the metallic seat of the seating component.

As a result of the C-ring's ability to retain its shape both by virtue of material memory and the fact that its inner volume is open to the environment (which is potentially a higher pressure side of the closure component 10), which allows the C-ring to expand with increasing pressure, constant contact is thus established between the seal 44 and the carrier body 22 on the one hand, and between the seal 44 and the metallic sealing element 14 on the other hand.

The retaining element or clamping ring 16 is also annular, but is partly hollow or dish-shaped. The retaining element 16 thus resembles a flat bottomed bowl with an annular side wall and with a central portion of a bottom or floor of the bowl removed. The retaining element 16 is attached to the closure body 12 by means of a plurality of equi-angularly spaced bolts 18 arranged in a circle and spaced from and parallel to the stroke axis 20, radially inwardly from the annular metallic sealing element 14 and passing through the portion 38. The retaining element 16 is thus attached to the closure carrier body 22 radially inwardly from the metallic sealing element 14 and extends radially outwardly over a portion of the closure body 12 from where it is attached to the closure body 12 by means of the bolts 18, to reach the metallic sealing element 14. The retaining element 16, as can be clearly seen from FIG. 2 of the drawings, is however spaced from the carrier body 22 and is not in direct contact with the carrier body 22 at all, in the embodiment illustrated. The fact that the retaining element 16 does not bear against the carrier body 22, but only against the annular metallic sealing element 14, provides a spring effect which limits differences in the seating load between the metallic sealing element 14 and the carrier body 22 at atmospheric temperature on the one hand, and at elevated operating temperature for the closure component 10 on the other hand. This also assists in inhibiting or preventing stress induced in the metallic sealing element 14 due to the metallic sealing element 14 deforming or buckling when the closure component 10 is seated to close a solids flow path in use.

Figure 4:
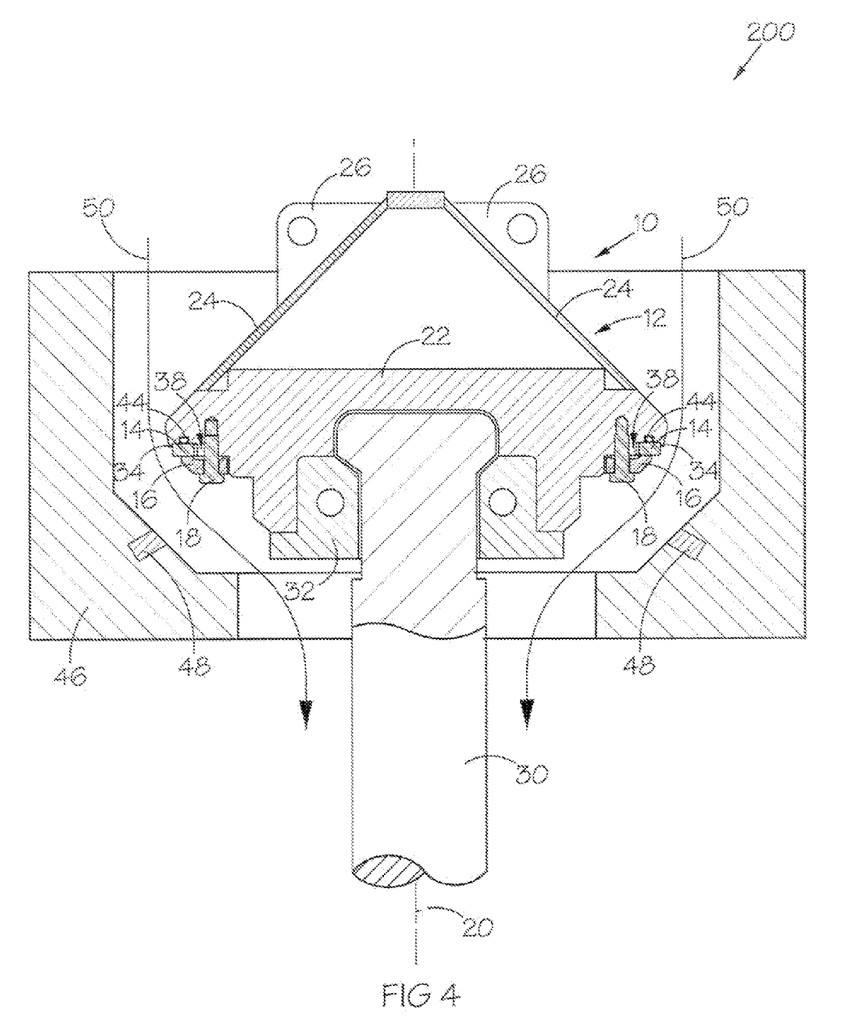
FIG. 4 shows a vertically-sectioned side view of a solids-handling closure assembly for solids-handling equipment, which includes the closure component of FIG. 2, in an open condition.
Figure 5:
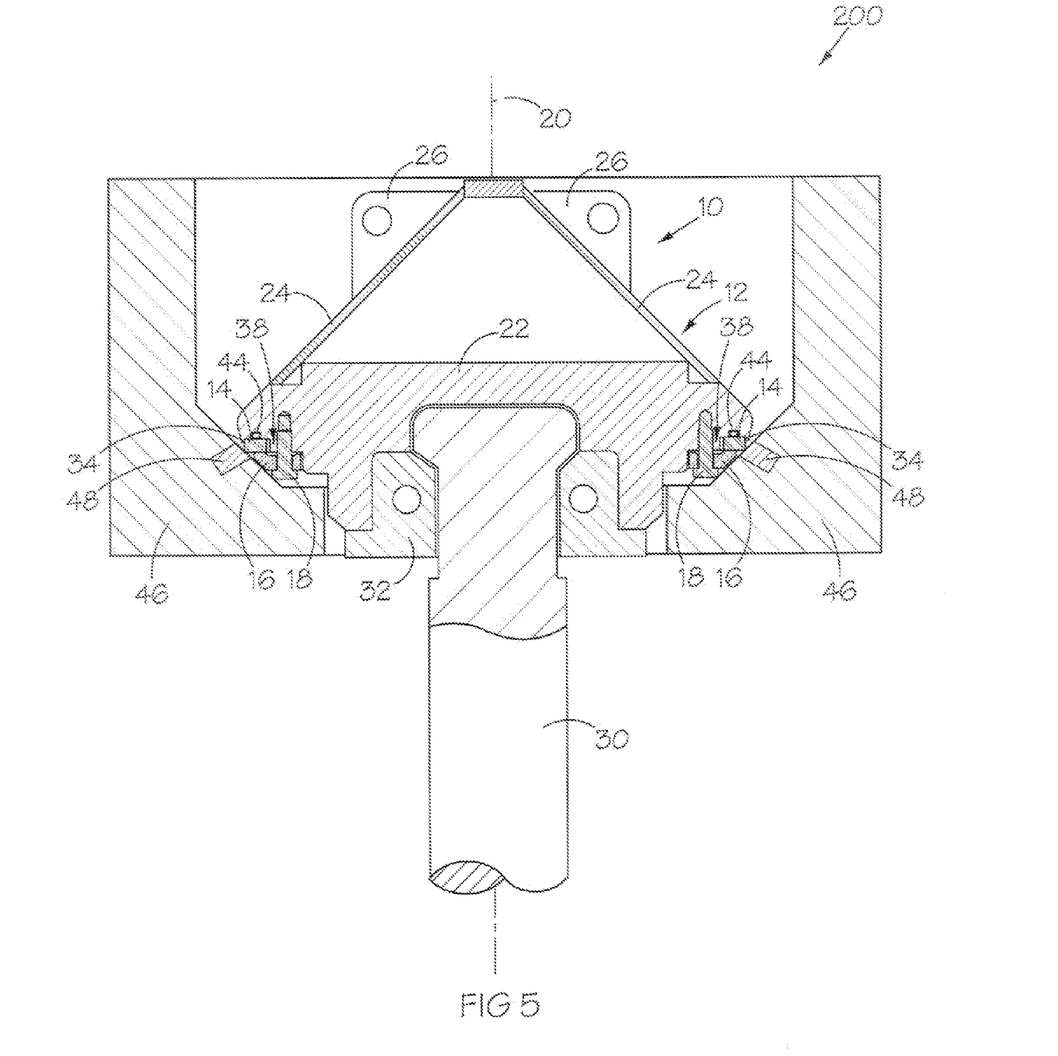
FIG. 5 shows a vertically-sectioned side view of the solids-handling closure assembly of FIG. 4, in a closed condition.

With reference to FIGS. 4 and 5 of the drawings, reference numeral 200 generally indicates a closure assembly in accordance with the invention, which includes the closure component 10. The closure assembly 200, as illustrated, is particularly suitable for use as a valve assembly in an ash lock (not shown) of a pressurised fixed bed dry bottom gasifier (not shown). Such ash locks and gasifiers are well known to those skilled in the art and do not require further description.

In addition to the closure component 10, the closure assembly 200 also includes a seat component 46 which includes an annular sealing element 48. As hereinbefore indicated, the annular sealing element 48 is typically a tungsten carbide ring similar to the metallic sealing element 14.

As illustrated in FIG. 4 of the drawings, when the closure component 10 is in an open condition, a solids flow path 50 exists through the solids-handling closure assembly 200. When used as part of an ash lock of a fixed bed dry bottom gasifier, the closure assembly 200, in the open condition illustrated in FIG. 4, thus allows ash to be passed from the pressurized gasifier into the ash lock, which is also then pressurized. When in the closed condition illustrated in FIG. 5, the closure assembly 200 prevents further flow of solids material into the ash lock and also provides a pressure seal across the closure assembly 200, as a result of the metal-to-metal contact between surfaces of the tungsten carbide sealing element 14 and the tungsten carbide sealing element 48. The ash lock can then be depressurized and the ash removed.

Advantageously, the use of a metallic sealing element 14 in conjunction with a locating formation which does not interfere with the metallic sealing element 14 during heat expansion of parts of the closure component 10, prevents or inhibits stress induced brittle fracture of the metallic sealing element 14. The position of the locating lip 34 allows proper positioning of the metallic sealing element 14, concentric with the carrier body 22 at room temperature, during assembly. As the locating lip 34 is however on the outer diameter of the closure body 12, the diameter of the annular surface 28 increases more at the operating temperature of the closure component 10 than that of the metallic sealing element 14 but importantly without interfering with the metallic sealing element 14 and without the associated stress on the metallic sealing element 14.

Improved sealing is achieved by use of the seal 44, particularly when in the form of a C-ring. A C-ring has the ability to retain its shape both by virtue of material memory and also due to the fact that its inner volume is open to the surrounding environment, which allows the C-ring to expand with increasing pressure. These two mechanisms collectively enable constant contact between the C-ring and the carrier body 22 and between the C-ring and the annular metallic sealing element 14. This is beneficial in that it allows for a limited degree of relative movement of these components, for example when the metallic sealing element 14 deflects slightly under impact when the closure component 10 slams shut under hydraulic actuation. Stress produced in the metallic sealing element 14 due to deflection of the metallic sealing element 14 on impact with the sealing element 48 is thus reduced.

The full surface of the retaining element 16 of the closure component 10 is not in contact with the carrier body 22. Instead, only a rim or radially outward peripheral portion of the retaining element 16 is in contact with the annular metallic sealing element 14. There is thus no contact with the carrier body 22 at the point where the retaining element 14 is bolted to the carrier body 22. This provides a spring effect which limits differences in the seating load at atmospheric and elevated temperatures, and this prevents the phenomena of stress induced due to the metallic sealing element 14 buckling when the closure component 10 is in a closed condition.

The modifications incorporated in the closure component 10, compared to the prior art closure component 100, individually and in combination, improve retention of the metallic sealing element 14 on the carrier body 22 and reduce or even eliminate the occurrences of leak paths between the carrier body 22 and the metallic sealing element 14. This leads to a reduction in lost production due to greater availability of equipment, a reduction in operating costs due to a reduction in maintenance on the metallic sealing elements 14 and 48 and greater equipment lifespan due to a decreased number of temperature cycles caused by unplanned outages. Advantageously, it is also relatively easy to modify existing closure components, such as the closure component 100, to include the features of the improved closure component 10. In other words, retrofitting of existing closure components to obtain the advantages of the invention is thus achieved by means of relatively minor modifications.

It must be appreciated that the closure component 10 and the closure assembly 200 may find application also in carbonaceous feedstock (e.g. coal) beneficiation or upgrading plants, and potentially also in other pressurised equipment or vessels handling solids material at elevated temperatures, e.g. combustion apparatus, pyrolysis apparatus, fluidised bed gasification apparatus, food processing apparatus and bulk material handling equipment for agricultural products or ore beneficiation. For use as a feedstock closure mechanism for feeding feedstock into a high pressure environment, the closure assembly 200 is typically inverted so that the closure assembly 200 is in a closed condition when the closure component 10 is at an upper end of its stroke. Other geometric changes may also be required (e.g. the shape or configuration of the cone-shaped end piece and positioning of sealing elements) beyond a simple inversion of the parts. Such required changes would however be readily apparent to a person skilled in the art.

The invention claimed is:

1. A closure component for solids-handling equipment, the closure component including:
   a closure body configured to close a solids flow path by displacement of the closure body along a stroke axis; and
   a removable tungsten carbide sealing element attached to the closure body and configured sealingly to engage an endless metallic seat spaced radially outwardly from the stroke axis when the closure body closes said solids flow path, the tungsten carbide sealing element being subject to brittle fracture and expanding at a lesser rate than the closure body during heat expansion;
   the closure body including or defining at least one locating formation to engage and locate the tungsten carbide sealing element, said at least one locating formation being positioned radially outwardly from the stroke axis and more radially outwardly from the stroke axis than at least a portion of the tungsten carbide sealing element so that at least a portion of the tungsten carbide sealing element is positioned between the locating formation and the stroke axis, thereby correctly to locate the tungsten carbide sealing element in position relative to the closure body or relative to the stroke axis during fitting of the tungsten carbide sealing element to the closure body; and
   in which there is no locating formation radially inwardly of the tungsten carbide sealing element such that radially outward displacement of the locating formation as a result of heat expansion of the closure body is inhibited by the presence of the tungsten carbide sealing element.

2. The closure component as claimed in claim 1, in which the tungsten carbide sealing element has an outer periphery circumnavigating the stroke axis and spaced from the stroke axis, with said at least one locating formation being adjacent said outer periphery.

3. The closure component as claimed in claim 2, in which the tungsten carbide sealing element has a circular outer periphery, and the at least one locating formation is in the form of an annular locating surface defined by the closure body, the locating surface defined by the closure body having a diameter marginally greater than that of an annular locating surface of the tungsten carbide sealing element, at room temperature.

4. The closure component as claimed in claim 3, in which the locating surface of the tungsten carbide sealing element is defined by the outer periphery of the tungsten carbide sealing element.

5. The closure component as claimed in claim 1, in which the tungsten carbide sealing element is annular and the closure body defines an annular recess to receive the annular tungsten carbide sealing element, a width of the annular recess taken in a radial direction relative to the stroke axis being greater than a width of the annular tungsten carbide sealing element taken in a radial direction relative to the stroke axis so that, when the annular tungsten carbide sealing element is located in the annular recess, the tungsten carbide sealing element is abutting against a radially outer periphery of the annular recess, whilst the tungsten carbide sealing element is spaced from a radially inner periphery of the annular recess.

6. The closure component as claimed in claim 1, which includes a seal between the closure body and the tungsten carbide sealing element, the seal circumnavigating or extending around the stroke axis.

7. The closure component as claimed in claim 6, in which the seal is located in an annular recess defined in at least one of the closure body and the tungsten carbide sealing element and located between the closure body and the tungsten carbide sealing element.

8. The closure component as claimed in claim 6, in which the seal is in the form of a hollow metal ring with one or more openings so that an interior volume of the ring is open to the immediate environment of the seal.

9. The closure component as claimed in claim 1, in which the tungsten carbide sealing element is held in place against the closure body by a retaining element which bears against the sealing element but which does not pass through the tungsten carbide sealing element, the retaining element being attached to the closure body radially inwardly from the tungsten carbide sealing element, thus extending radially outwardly over a portion of the closure body from where it is attached to the closure body to reach the tungsten carbide sealing element.

10. The closure component as claimed in claim 9, in which the retaining element is spaced from the closure body so that there is no direct contact between the retaining element and the closure body.

11. A solids-handling closure assembly which includes:
a closure component as claimed in claim 1, the closure component displaceable between a closed condition and an open condition to close or open a solids flow path; and
a seat component providing a metallic seat for the closure component when in the closed condition.

12. The solids-handling closure assembly of claim 11, which forms part of a pressurised gasifier for gasification of particulate carbonaceous material.

13. The solids-handling closure assembly of claim 12, which forms part of an ash lock valve assembly of said pressurised gasifier.

* * * * *